(12) United States Patent
Park et al.

(10) Patent No.: US 12,410,272 B2
(45) Date of Patent: Sep. 9, 2025

(54) MODIFIED CONJUGATED DIENE-BASED POLYMER AND RUBBER COMPOSITION INCLUDING THE SAME

(71) Applicant: LG CHEM, LTD., Seoul (KR)

(72) Inventors: Hyeon Jong Park, Daejeon (KR); Suk Joon Yoo, Daejeon (KR); No Ma Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 684 days.

(21) Appl. No.: 17/790,561

(22) PCT Filed: Aug. 4, 2021

(86) PCT No.: PCT/KR2021/010226
§ 371 (c)(1),
(2) Date: Jul. 1, 2022

(87) PCT Pub. No.: WO2022/031002
PCT Pub. Date: Feb. 10, 2022

(65) Prior Publication Data
US 2023/0093015 A1    Mar. 23, 2023

(30) Foreign Application Priority Data
Aug. 5, 2020   (KR) ........................ 10-2020-0098095

(51) Int. Cl.
*C08F 236/10* (2006.01)
*C08K 3/36* (2006.01)

(52) U.S. Cl.
CPC .............. *C08F 236/10* (2013.01); *C08K 3/36* (2013.01)

(58) Field of Classification Search
CPC ............................... C08F 236/10; C08K 3/36
USPC ........................................................ 524/588
See application file for complete search history.

(56) References Cited

U.S. PATENT DOCUMENTS

| | | | |
|---|---|---|---|
| 4,397,994 A | 8/1983 | Takeuchi et al. | |
| 9,279,045 B2 | 3/2016 | Hoshino et al. | |
| 9,845,366 B2 | 12/2017 | Kloppenburg et al. | |
| 2009/0163668 A1 | 6/2009 | Yamada et al. | |
| 2009/0203843 A1 | 8/2009 | Fukuoka et al. | |
| 2011/0046263 A1 | 2/2011 | Hoshino et al. | |
| 2012/0270997 A1 | 10/2012 | Tanaka et al. | |
| 2014/0221563 A1 | 8/2014 | Morita | |
| 2015/0252126 A1 | 9/2015 | Kloppenburg et al. | |
| 2015/0376321 A1 | 12/2015 | Lee | |
| 2016/0009903 A1 | 1/2016 | Morita et al. | |
| 2018/0371125 A1 | 12/2018 | Kim et al. | |
| 2021/0079124 A1 | 3/2021 | Lee et al. | |
| 2022/0127438 A1 | 4/2022 | Kim et al. | |

FOREIGN PATENT DOCUMENTS

| | | |
|---|---|---|
| CN | 111212858 A | 5/2020 |
| EP | 2492286 A1 | 8/2012 |
| JP | H08-193147 A | 7/1996 |
| JP | 2002-284934 A | 10/2002 |
| JP | 2009-227858 A | 10/2009 |
| JP | 2011-006543 A | 1/2011 |
| JP | 2013-249419 A | 12/2013 |
| JP | 2015-518516 A1 | 7/2015 |
| JP | 2015-218284 A | 12/2015 |
| JP | 2018-123225 A | 8/2018 |
| KR | 10-2008-0035018 A | 4/2008 |
| KR | 10-2009-0008478 A | 1/2009 |
| KR | 10-2014-0127773 A | 11/2014 |
| KR | 10-2015-0037671 A | 4/2015 |
| KR | 10-2015-0122142 A | 10/2015 |
| KR | 20180080108 A * | 7/2018 |
| KR | 10-2019-0128583 A | 11/2019 |
| RU | 2475368 C2 | 2/2013 |
| RU | 2638960 C2 | 12/2017 |
| SG | 11202110157R A | 10/2021 |
| WO | 2013-031850 A1 | 7/2013 |

OTHER PUBLICATIONS

International Search Report (with partial translation) and Written Opinion dated Nov. 30, 2021, for corresponding International Patent Application No. PCT/KR2021/010226.
Extended European Search Report issued in application 21854319.7 dated Jun. 26, 2023.
Office Action issued in Chinese patent application 202180008756.9 dated Nov. 23, 2023.
Office Action issued on Apr. 17, 2024 for the corresponding Singapore Patent Application 11202251125H.
Office Action dated Sep. 11, 2022, issued in corresponding Japanese Patent Application No. 2022-541865.
Vorobyeva G. Ya. Chemical resistance of polymer materials // M.: Chemistry. 1981. T. 295. p. 34-41.
Chruściel J. J. et al., Modification of epoxy resins with functional silanes, polysiloxanes, silsesquioxanes, silica and silicates, Progress in Polymer Science, 2015, vol. 41, pp. 81-113.
Dvorko I. M., Epoxy one-pack composites and plastic foams based on them (A review), International Polymer Science and Technology, 2004. vol. 31, No. 11, pp. 25-31.
V. Palm et al. Reactivity of organic compounds. Tartu State University. 1977, vol. XIV, issue 1(49), pp. 337-338.
RU Office Action issued on Jun. 17, 2024 for the corresponding Russian patent application 2022120567/04(043230).

* cited by examiner

*Primary Examiner* — Deve V Hall
(74) *Attorney, Agent, or Firm* — Morgan, Lewis & Bockius LLP

(57) ABSTRACT

The present disclosure relates to a modified conjugated diene-based polymer and a rubber composition including the same, and provides a modified conjugated diene-based polymer including a first polymer chain and a second polymer chain, including a repeating unit derived from a conjugated diene-based monomer and a derived unit from a nitrogen-containing modification initiator, in each, wherein the first polymer chain includes a derived unit from an aminoalkoxysilane-based modifier in at least one terminal, the second polymer chain includes a derived unit from an aminoepoxy-based modifier in at least one terminal, and the aminoalkoxysilane-based modifier includes 6 or more alkoxy groups in a molecule.

11 Claims, No Drawings

MODIFIED CONJUGATED DIENE-BASED POLYMER AND RUBBER COMPOSITION INCLUDING THE SAME

CROSS-REFERENCE TO RELATED APPLICATIONS

The present application claims the benefit of priority based on Korean Patent Application No. 10-2020-0098095, filed on Aug. 5, 2020, the entire contents of which are incorporated herein by reference.

TECHNICAL FIELD

The present invention relates to a modified conjugated diene-based polymer having improved rotation resistance, processability and abrasion resistance, and a rubber composition including the same.

BACKGROUND ART

According to the recent demand for cars having a low fuel consumption ratio, a conjugated diene-based polymer having modulational stability represented by wet skid resistance as well as low running resistance, and excellent abrasion resistance and tensile properties is required as a rubber material for tires.

In order to reduce the running resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

The solution-polymerized SBR is prepared using an anionic polymerization initiator, and a method introducing a functional group into a terminal by coupling or modifying the chain terminal of the polymer thus formed using various modifiers is being used. For example, U.S. Pat. No. 4,397,994 discloses a method of the coupling active anion of the chain terminal of a polymer obtained by polymerizing styrene-butadiene using alkyllithium which is a monofunctional initiator, in a non-polar solvent using a coupling agent such as a tin compound.

In addition, in the case of using the solution-polymerized SBR as a rubber material, the vinyl content in the SBR may increase, and physical properties required for tires such as running resistance may be controlled, but in the case where the vinyl content is high, brake performance and abrasion resistance may become unfavorable in some aspects, and accordingly, the styrene content in the SBR is required to be maintained to a certain level or more, but in this case, there are problems of not showing effects by the high vinyl content.

Accordingly, there have been attempts to improve running resistance, wet skit resistance and abrasion resistance in balance by using a block copolymer SBR including two block copolymer units having styrene and vinyl content gradients as the solution-polymerized SBR, but the improvement was just an insignificant level or there were no improving effects.

PRIOR ART DOCUMENTS (Patent Document 1) JP Laid-open Patent No. Hei 8-193147 (1996. 07. 30.)
(Patent Document 2) U.S. Pat. No. 4,397,994 A (1983. 08. 09.)

DISCLOSURE OF THE INVENTION

Technical Problem

The present invention has been devised to solve the above-mentioned problems of the conventional technique, and an object is to provide a modified conjugated diene-based polymer which has a high molecular weight and controlled molecular weight distribution and degree of branching and is capable of improving the abrasion resistance and processability during applying to a rubber composition, by including a first polymer chain and a second polymer chain, which include a derived unit from a modification initiator in each and include derived units from two different types of modifiers having different numbers of functional groups having reaction activity to an active polymer, respectively.

In addition, an object of the present invention is to provide a rubber composition including the modified conjugated diene-based polymer and a filler, and having excellent processability and abrasion resistance.

Technical Solution

To solve the above-described tasks, according to an embodiment of the present invention, the present invention provides a modified conjugated diene-based polymer including a first polymer chain and a second polymer chain, including a repeating unit derived from a conjugated diene-based monomer and a derived unit from a nitrogen-containing modification initiator in each, wherein the first polymer chain includes a derived unit from an aminoalkoxysilane-based modifier in at least one terminal, the second polymer chain includes a derived unit from an aminoepoxy-based modifier in at least one terminal, and the aminoalkoxysilane-based modifier includes 6 or more alkoxy groups in a molecule.

In addition, the present invention provides a rubber composition including the modified conjugated diene-based polymer and a filler.

Advantageous Effects

The modified conjugated diene-based polymer according to the present invention includes a first polymer chain and a second polymer chain, having different degrees of branching by including a functional group having affinity with a filler in each, and being prepared using two types of modifiers having different numbers of functional groups having reaction activity with an active polymer, and has a high molecular weight, controlled molecular weight distribution and degree of branching, and excellent effects of mechanical properties, processability and rotation resistance in balance.

In addition, the rubber composition according to the present invention includes the modified conjugated diene-based polymer, and accordingly, both abrasion resistance and processability may be excellent.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition

In the present disclosure, the term "polymer" refers to a polymer compound prepared by polymerizing monomers irrespective of the same or different kinds of monomers. Likewise, the general term polymer refers to a polymer prepared by only one kind of monomer and includes commonly used terms homopolymer and copolymer.

In the present disclosure, the term "1,2-vinyl bond content" refers to the mass (or weight) percent of butadiene included in 1 and 2 positions in a polymer chain on the basis of a conjugated diene monomer (butadiene, etc.) moiety (on the basis of the total weight of polymerized butadiene) in the polymer.

In the present disclosure, the term "alkyl group" may mean a monovalent aliphatic saturated hydrocarbon and may include both linear alkyl group such as methyl, ethyl, propyl and butyl, and branched alkyl group such as isopropyl, sec-butyl, tert-butyl and neo-pentyl.

In the present disclosure, the term "alkenyl group" may mean a monovalent aliphatic unsaturated hydrocarbon including one or two or more double bonds.

In the present disclosure, the term "alkynyl group" may mean a monovalent aliphatic unsaturated hydrocarbon including one or two or more triple bonds.

In the present disclosure, the term "alkylene group" may mean a divalent aliphatic saturated hydrocarbon such as methylene, ethylene, propylene and butylene.

In the present disclosure, the term "aryl group" may mean aromatic hydrocarbon and may include both monocyclic aromatic hydrocarbon in which one ring is formed and polycyclic aromatic hydrocarbon in which two or more rings are combined.

In the present disclosure, the term "heterocyclic group" is obtained by substituting carbon atoms in a cycloalkyl group or an aryl group with one or more heteroatoms and may mean, for example, both a heterocycloalkyl group and a heteroaryl group.

In the present disclosure, the terms "comprising", and "having" and the derivatives thereof, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of -" excludes unnecessary ones for operation and precludes optional other components, steps or processes from the scope of optional continuous description. The term "consisting of -" precludes optional components, steps or processes, which are not particularly described or illustrated.

Measurement Method and Conditions

In the present disclosure, the "glass transition temperature (Tg)" is obtained as follows: a modified conjugated diene-based polymer is considered as a specimen, and based on ISO 22768:2006, a differential scanning calorimeter (product name "DSCQ100" manufactured by TA Co.) is used, nitrogen is circulated in a rate of 50 mL/min, and a 70-6DSC curve is recorded while elevating the temperature from −80° C. in a rate of 10° C./min, and the peak top (inflection point) of a DSC differential curve is measured as the glass transition temperature.

In the present disclosure, a "weight average molecular weight (Mw)", a "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C(Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In addition, a coupling number (C.N.) is obtained as follows: a portion of a polymer is collected before performing first modification reaction by injecting an initial modifier to obtain the peak molecular weight ($Mp_1$) of the polymer, the peak molecular weight ($Mp_2$) of a modified conjugated diene-based polymer finally modified and prepared is obtained, and calculation is performed by Mathematical Equation 1 below.

$$\text{Coupling number (C.N.)} = Mp_2/Mp_1 \quad \text{[Mathematical Equation 1]}$$

In the present disclosure, the "1,2-vinyl bond content" is measured and analyzed using Varian VNMRS 500 MHz NMR, and the 1,2-vinyl bond content in the total polymer is calculated and measured by using 1,1,2,2-tetrachloroethane as a solvent during measuring NMR, and calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

In the present disclosure, for measuring a "mooney viscosity (MV)" and a "mooney stress relaxation ratio (—S/R)", the mooney viscosity (MV, (ML1+4, @100° C. MU) is measured using MV-2000 (ALPHA Technologies Co.) using Large Rotor at a rotor speed of 2±0.02 rpm at 100° C. In this case, a specimen used is stood at room temperature (23±3° C.) for 30 minutes or more, and 27±3 g of the specimen is collected and put in a die cavity, and then, Platen is operated for 4 minutes for measurement. After measuring the mooney viscosity, the slope value of the change of the mooney viscosity shown while releasing torque is measured, and the absolute value thereof is considered as the mooney stress relaxation ratio.

In the present disclosure, the "N atom content" may be measured, for example, through an NSX analysis method, and the NSX analysis method uses a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, the "Si atom content" is measured using an inductively coupled plasma optical emission spectroscopy (ICP-OES; Optima 7300DV) as an ICP analysis method. Particularly, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

The present invention provides a modified conjugated diene-based polymer having excellent mechanical properties and processability in balance by including a first polymer chain and a second polymer chain, having different degrees of branching, by including a functional group having affinity with a filler in each, and being prepared by using two types of modifiers having different numbers of functional groups having reaction activity with an active polymer.

The modified conjugated diene-based polymer according to an embodiment of the present invention is characterized in including a first polymer chain and a second polymer chain, including a repeating unit derived from a conjugated diene-based monomer and a derived unit from a nitrogen-containing modification initiator in each, wherein the first polymer chain includes a derived unit from an aminoalkoxysilane-based modifier in at least one terminal, the second polymer chain includes a derived unit from an aminoepoxy-based modifier in at least one terminal, and the aminoalkoxysilane-based modifier includes 6 or more alkoxy groups in a molecule.

According to an embodiment of the present invention, the modified conjugated diene-based polymer is prepared by a preparation method which will be explained later and in which modification reaction is performed using two types of modifiers having different numbers of functional groups having reaction activity with an active polymer in order, and may include a first polymer chain which is modified from a modifier having a relatively greater number of functional groups and has a higher degree of branching, and a second polymer chain which is modified from a modifier having a relatively smaller number of functional groups and has a lower degree of branching. By including the first polymer chain and the second polymer chain, the modified conjugated diene-based polymer may become mechanical properties excellent and may be processability excellent.

Particularly, each of the first polymer chain and the second polymer chain may include a derived unit from a nitrogen-containing modification initiator and a repeating unit derived from a conjugated diene-based monomer, the first polymer chain may include a derived unit from an aminoalkoxysilane-based modifier in at least one terminal, and the second polymer chain may include a derived unit from an aminoepoxy-based modifier in at least one terminal.

Here, the repeating unit derived from the conjugated diene-based monomer may mean a repeating unit formed during polymerizing a conjugated diene-based monomer, and the derived unit from the modifier may mean a functional group derived from a modifier present in at least one terminal of the active polymer through the reaction or coupling between the active polymer which is prepared by the polymerization of the conjugated diene-based monomer and the modifier.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

In addition, each of the first polymer chain and the second polymer chain may further include a repeating unit derived from an aromatic vinyl-based monomer, and in this case, may include the repeating unit derived from an aromatic vinyl monomer in 30 wt % or less, or 10 wt % to 25 wt %. Within this range, effects of excellent balance between rolling resistance and wet skid resistance may be achieved.

The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene.

In another embodiment, each of the first polymer chain and the second polymer chain may further include a repeating unit derived from a diene-based monomer of 1 to 10 carbon atoms together with the repeating unit derived from a conjugated diene-based monomer. The repeating unit derived from a diene-based monomer may be a repeating unit derived from a diene-based monomer which is different from the conjugated diene-based monomer, and the diene-based monomer which is different from the conjugated diene-based monomer may be, for example, 1,2-butadiene.

In addition, the modified conjugated diene-based polymer includes the first polymer chain and the second polymer chain and includes a first polymer chain having a relatively lower degree of branching and a second polymer chain having a relatively higher degree of branching, and since the whole degree of branching may be suitably controlled, optimally improving effects of mechanical properties and processability may be achieved.

Particularly, the first polymer chain includes a derived unit from a nitrogen-containing modification initiator, a repeating unit derived from a conjugated diene-based monomer and a derived unit from an aminoalkoxysilane-based modifier, further includes a repeating unit derived from an aromatic vinyl-based monomer as necessary, and is prepared by reacting an active polymer prepared by polymerizing a conjugated diene-based monomer, as by the preparation method described later, with the aminoalkoxysilane-based modifier including 6 or more alkoxy groups which are polymer modification functional groups, for a certain time, thereby achieving a high degree of branching.

In addition, the second polymer chain includes a derived unit from a nitrogen-containing modification initiator, a repeating unit derived from a conjugated diene-based monomer and a derived unit from an aminoepoxy-based modifier, further includes a repeating unit derived from an aromatic vinyl-based monomer, as necessary, and is prepared by reacting an unmodified active polymer after modification reaction with the aminoalkoxysilane-based modifier as in the preparation method described later, with an aminoepoxy-based modifier having 4 or less epoxy groups, or epoxy groups and alkoxy groups, which are modification functional groups, in a molecule, thereby achieving a relatively lower degree of branching and high linearity.

Meanwhile, the nitrogen-containing modification initiator may be prepared by reacting a nitrogen-containing compound and an organometallic compound and may particularly be a styrene-based compound including a substituted with a substituent or unsubstituted amino group, amide group, imino group, imidazole group, pyrimidyl group or cyclic amino group in a molecule, where the substituent may be an alkyl group of 1 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms, or an alkoxysilyl group of 1 to 10 carbon atoms.

For example, the nitrogen-containing compound may be a compound represented by Formula 1 below.

[Formula 1]

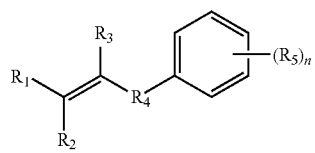

In Formula 1, $R_1$ to $R_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_4$ is a single bond; a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, $R_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by Formula 1a or Formula 1b below, n is an integer of 1 to 5, and at least one among $R_5$ groups is a functional group represented by Formula 1a or Formula 1b below, in the case where n is an integer of 2 to 5, multiple $R_5$ groups may be the same or different from each other,

[Formula 1a]

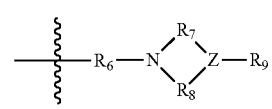

In Formula 1a, $R_6$ is a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, $R_7$ and $R_8$ are each independently an alkylene group of 1 to 20 carbon atoms which substituted with an alkyl group of 1 to 10 carbon atoms, a cycloalkyl group of 5 to 10 carbon atoms, or an aryl group of 5 to 20 carbon atoms or unsubstituted, $R_9$ is hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and Z is an N, O or S atom, in the case where Z is O or S, $R_9$ is not present,

[Formula 1b]

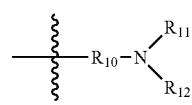

in Formula 1b, $R_{10}$ is a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, and $R_{11}$ and $R_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

Particularly, the compound represented by Formula 1 may be the compound of Formula 1, where $R_1$ to $R_3$ are each independently hydrogen; an alkyl group of 1 to 10 carbon atoms; an alkenyl group of 2 to 10 carbon atoms; or an alkynyl group of 2 to 10 carbon atoms, $R_4$ is a single bond; or an unsubstituted alkylene group of 1 to 10 carbon atoms, $R_5$ is an alkyl group of 1 to 10 carbon atoms; an alkenyl group of 2 to 10 carbon atoms; an alkynyl group of 2 to 10 carbon atoms; or a functional group represented by Formula 1a or Formula 1b below, in Formula 1a, $R_6$ is an unsubstituted alkylene group of 1 to 10 carbon atoms, $R_7$ and $R_8$ are each independently an unsubstituted alkylene group of 1 to 10 carbon atoms, $R_9$ is an alkyl group of 1 to 10 carbon atoms; a cycloalkyl group of 5 to 20 carbon atoms; an aryl group of 5 to 20 carbon atoms; or a heterocyclic group of 3 to 20 carbon atoms, and in Formula 1b, $R_{10}$ is an unsubstituted alkylene group of 1 to 10 carbon atoms, and $R_{11}$ and $R_{12}$ are each independently an alkyl group of 1 to 10 carbon atoms; a cycloalkyl group of 5 to 20 carbon atoms; an aryl group of 5 to 20 carbon atoms; or a heterocyclic group of 3 to 20 carbon atoms.

More particularly, the compound represented by Formula 1 may be a compound represented by Formula 1-1 to Formula 1-3 below.

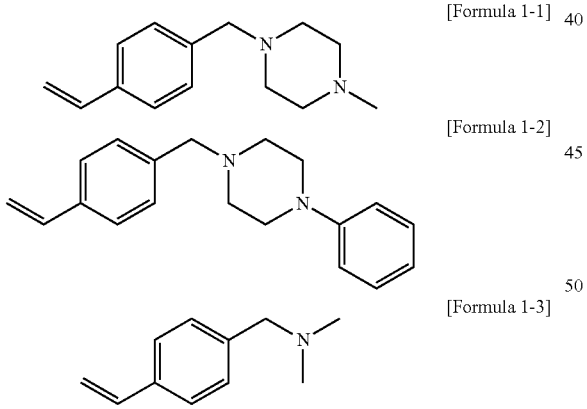

[Formula 1-1]

[Formula 1-2]

[Formula 1-3]

In addition, the organometallic compound may be an organic alkali metal compound, for example, may be one or more selected from the group consisting of an organolithium compound, an organosodium compound, an oragnopotassium compound, an organorubidium compound and an organocesium compound.

Particularly, the organometallic compound may be one or more selected from the group consisting of methyllithium, ethyllithium, isopropyllithium, n-butyllithium, sec-butyllithium, tert-butyllithium, n-decyllithium, tert-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium and 4-cyclopentyl lithium.

In addition, the aminoalkoxysilane-based modifier may be a compound including 6 or more alkoxy groups in a molecule, and particularly, the aminoalkoxysilane-based modifier may be a compound including 6 to 12, more particularly, 6 to 9 alkoxy groups in a molecule, for example, one or more selected from the compounds represented by Formula 2 to Formula 4 below.

[Formula 2]

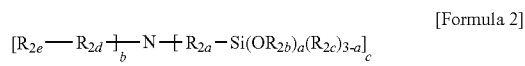

In Formula 2, $R_{2a}$ and $R_{2d}$ are each independently a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, $R_{2b}$ and $R_{2c}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, or an aryl group of 6 to 20 carbon atoms, and $R_{2e}$ is an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, a heterocyclic group of 2 to 10 carbon atoms, or —N—[$R_{2f}$—Si($OR_{2g}$)$_d$($R_{2h}$)$_{3-d}$]$_2$, where $R_{2f}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, $R_{2g}$ and $R_{2h}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, or an aryl group of 6 to 20 carbon atoms, d is an integer of 1 to 3, a is an integer of 1 to 3, b is 0 or 1, and c is 2 or 3, where in the case where b is 0, and in the case where b is 1, and $R_{2e}$ is not —N—[$R_{2f}$—Si($OR_{2g}$)$_d$($R_{2h}$)$_{3-d}$]$_2$, a+c is 5 or 6, and in the case where b is 1, and $R_{2e}$ is —N—[$R_{2f}$—Si($OR_{2g}$)$_d$($R_{2h}$)$_{3-d}$]$_2$, a+c is 4 or 5,

[Formula 3]

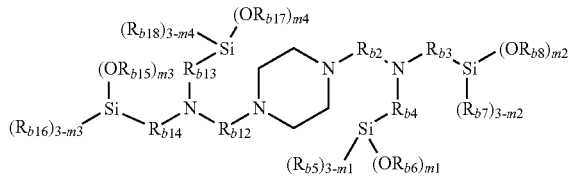

in Formula 3, $R_{b2}$ to $R_{b4}$ are each independently an alkylene group of 1 to 10 carbon atoms, $R_{b5}$ to $R_{b8}$ are each independently an alkyl group of 1 to 10 carbon atoms, $R_{b12}$ to $R_{b14}$ are each independently an alkylene group of 1 to 10 carbon atoms, $R_{b15}$ to $R_{b18}$ are each independently an alkyl group of 1 to 10 carbon atoms, and $m_1$, $m_2$, $m_3$ and $m_4$ are each independently an integer of 1 to 3,

[Formula 4]

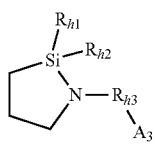

in Formula 4, $R_{h1}$ and $R_{h2}$ are each independently an alkyl group of 1 to 10 carbon atoms or an alkoxy group of 1 to 10 carbon atoms, $R_{h3}$ is a single bond or an alkylene group of 1 to 10 carbon atoms, and $A_3$ is —N $[Si(R_{h4}R_{h5}R_{h6})]_2$, where $R_{h4}$ to $R_{h6}$ are each independently an alkoxy group of 1 to 10 carbon atoms.

Particularly, in Formula 2, $R_{2a}$ and $R_{2d}$ may be each independently a single bond or an alkylene group of 1 to 10 carbon atoms, $R_{2b}$ and $R_{2c}$ may be each independently an alkyl group of 1 to 10 carbon atoms, a heteroalkyl group of 1 to 10 carbon atoms, a cycloalkyl group of 5 to 10 carbon atoms or an aryl group of 6 to 10 carbon atoms, and $R_{2e}$ may be an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, a heterocyclic group of 2 to 10 carbon atoms, or —N—$[R_{2f}$—$Si(OR_{2g})_d(R_{2h})_{3-d}]_2$, where $R_{2f}$ is a single bond, or an unsubstituted alkylene group of 1 to 10 carbon atoms, and $R_{2g}$ and $R_{2h}$ are each independently an alkyl group of 1 to 10 carbon atoms, a heteroalkyl group of 1 to 10 carbon atoms, a cycloalkyl group of 5 to 10 carbon atoms, or an aryl group of 6 to 10 carbon atoms.

In a more particular embodiment, the compound represented by Formula 2 may be one selected from the group consisting of N,N-bis(3-(trimethoxysilyl)propyl)-methyl-1-amine, N,N-bis(3-(triethoxysilyl)propyl)-methyl-1-amine, tri(trimethoxysilyl)amine, tri(3-(trimethoxysilyl)propyl)amine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimehtoxysilyl)propyl)-1H-1,2,4-triazol-3-yl)propyl)propan-1-amine, N,N-bis(3-(trimethoxysilyl)propyl)-2,5,8,11,14-pentaoxahexadecan-16-amine, and $N^1,N^1,N^3,N^3$-tetrakis(3-(trimethoxysilyl)propyl)propane-1,3-diamine.

In addition, the compound represented by Formula 3 may be 3,3'-piperazine-1,4-diyl)bis(N,N-bis(3-(triethoxysilyl)propyl)propan-1-amine.

In addition, the compound represented by Formula 4 may be 3-(2,2-dimethoxy-1,2-azasilolidin-1-yl)-N,N-bis(3-(trimethoxysilyl)propyl)propan-1-amine.

In addition, the aminoepoxy-based modifier may be a compound including four or less polymer modification functional groups in a molecule, and here, the polymer modification functional group may be an epoxy group, or an epoxy group and an alkoxy group. Particularly, the aminoepoxy-based modifier may be a compound including 1 to 4 polymer modification functional groups in a molecule, for example, one or more selected from the compounds represented by Formula 5 to Formula 7 below.

[Formula 5]

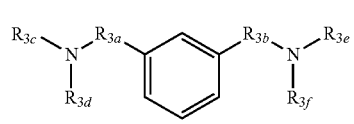

In Formula 5, $R_{3a}$ and $R_{3b}$ are each independently an alkylene group of 1 to 10 carbon atoms, and $R_{3c}$ to $R_{3f}$ are each independently hydrogen, an alkyl group of 1 to 10 carbon atoms or —$R_{3g}R_{3h}$, where at least one among $R_{3c}$ to $R_{3f}$ is —$R_{3g}R_{3h}$, $R_{3g}$ is a single bond or an alkylene group of 1 to 10 carbon atoms, which includes or excludes a heteroatom, and $R_{3h}$ is an alkoxysilyl group of 1 to 10 carbon atoms or an epoxy group,

[Formula 6]

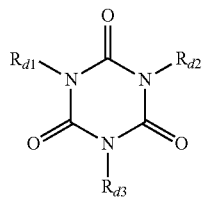

in Formula 6, $R_{d1}$ to $R_{d3}$ are each independently hydrogen, an alkyl group of 1 to 10 carbon atoms or —$R_{d4}R_{d5}$, where at least one among $R_{d1}$ to $R_{d3}$ is —$R_{d4}R_{d5}$, $R_{d4}$ is an alkylene group of 1 to 10 carbon atoms, which includes or excludes a heteroatom, and $R_{d5}$ is an epoxy group,

[Formula 7]

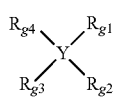

in Formula 7, $R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or —$R_{g5}OR_{g6}$, where at least one among $R_{g1}$ to $R_{g4}$ is —$R_{g5}OR_{g6}$, $R_{g5}$ is a single bond or an alkylene group of 1 to 10 carbon atoms, and $R_{g6}$ is an epoxyalkyl group of 3 to 10 carbon atoms, and Y is C or N, in the case where Y is N, $R_{g4}$ is not present.

Particularly, in Formula 5, $R_{3a}$ and $R_{3b}$ are each independently an alkylene group of 1 to 6 carbon atoms, and $R_{3c}$ to $R_{3f}$ may be each independently an alkyl group of 1 to 6 carbon atoms or $-R_{3g}R_{3h}$, where at least one among $R_{3c}$ to $R_{3f}$ may be $-R_{3g}R_{3h}$, $R_{3g}$ may be a single bond or an alkylene group of 1 to 6 carbon atoms, and $R_{3h}$ may be an epoxy group.

More particularly, the compound represented by Formula 5 may be a compound represented by Formula 5-1 below.

[Formula 5-1]

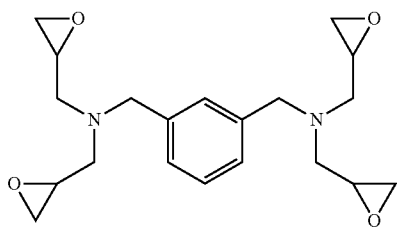

In Formula 6, $R_{d1}$ to $R_{d3}$ are each independently an alkyl group of 1 to 6 carbon atoms or $-R_{d4}R_{d5}$, where at least one among $R_{d1}$ to $R_{d3}$ may be $-R_{d4}R_{d5}$, $R_{d4}$ may be an alkylene group of 1 to 6 carbon atoms, which includes or excludes a heteroatom, $R_{d5}$ may be an epoxy group, and the heteroatom may be O (oxygen atom).

More particularly, the compound represented by Formula 6 may be a compound represented by Formula 6-1 below.

[Formula 6-1]

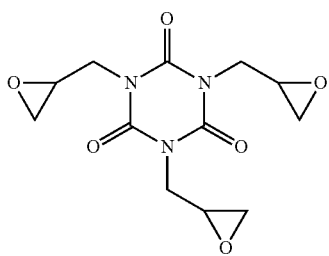

In addition, in Formula 7, $R_{g1}$ to $R_{g4}$ are each independently an alkyl group of 1 to 6 carbon atoms, an alkoxy group of 1 to 6 carbon atoms, or $-R_{g5}R_{g6}$, where at least one among $R_{g1}$ to $R_{g4}$ may be $-R_{g5}R_{g6}$, $R_{g5}$ may be an alkylene group of 1 to 6 carbon atoms, which includes or excludes a heteroatom, $R_{g6}$ may be an epoxy group, and the heteroatom may be O.

More particularly, the compound represented by Formula 7 may be selected from the compounds represented by Formula 7-1 to Formula 7-4 below.

[Formula 7-1]

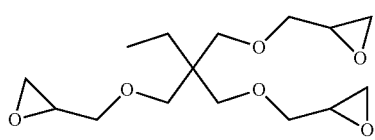

[Formula 7-2]

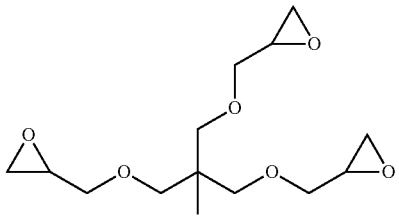

[Formula 7-3]

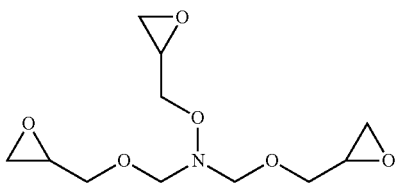

[Formula 7-4]

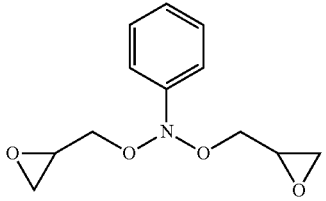

In addition, the modified conjugated diene-based polymer may have a weight average molecular weight (Mw) measured by gel permeation chromatography (GPC) of 1,000,000 g/mol to 3,000,000 g/mol, particularly, 1,200,000 g/mol to 2,000,000 g/mol. Within this range, effects of excellent running resistance and abrasion resistance may be achieved.

In addition, the modified conjugated diene-based polymer may have molecular weight distribution (PDI; MWD; Mw/Mn) of 1.0 to 2.0, particularly, 1.5 to 2.0, and within this range, tensile properties and viscoelasticity properties are excellent, and excellent balance between physical properties may be achieved.

Meanwhile, the modified conjugated diene-based polymer may have a number average molecular weight (Mn) of 500,000 g/mol to 3,000,000 g/mol, or 600,000 g/mol to 1,300,000 g/mol.

In another embodiment, the modified conjugated diene-based polymer has a unimodal shape molecular weight distribution curve by gel permeation chromatography (GPC), and the unimodal curve shape may be determined in view of continuous type polymerization method, and in view of modification reaction performed by a modifier or a coupling agent.

In addition, the modified conjugated diene-based polymer satisfies the glass transition temperature of −40° C. or less, particularly, −70° C. to −40° C., or −60° C. to −40° C. The glass transition temperature may be changed depending on the amount of the aromatic vinyl-based monomer which is a comonomer, but is not determined by only the amount of the comonomer but may be changeable according to a polymerization method and conditions. That is, the modified conjugated diene-based polymer prepared to satisfy the above-described range may have excellent affinity with a filler such as silica and carbon black during compounding with a modified conjugated diene-based polymer prepared and may have improved abrasion resistance, and within the range, the rotation resistance and abrasion resistance of a rubber composition including the same may be excellent in balance.

In addition, the modified conjugated diene-based polymer may satisfy each of the Si content and the N content of 70 ppm or more, particularly, 70 ppm to 10,000 ppm, or 100 ppm to 5,000 ppm based on the total weight of the polymer, and within these ranges, a rubber composition including the modified conjugated diene-based polymer has effects of showing excellent mechanical properties such as tensile properties and viscoelasticity properties. The Si content and the N content may mean the amount of Si atoms and the amount of N atoms, respectively, present in the modified conjugated diene-based polymer. Meanwhile, the Si atom may be derived from a functional group derived from a modifier, and the N atom may be derived from a functional group derived from a modification initiator and a modifier.

Here, the Si content and the N content may be influenced by the degree of coupling by a modifier in modification reaction and may be controlled by the amount injected of a modifier, the amount of a polar additive, and the reaction time during preparation, the mixing time and mixing degree of a modifier and an active polymer, or the like.

In addition, the modified conjugated diene-based polymer may satisfy the coupling number of greater than 2.5 and less than 5.0, particularly, 2.8 or more and less than 5.0, or 3.0 or more and 4.5 or less, and within this range, the Si content, the N content, and the weight average molecular weight may be easily controlled as described above.

In addition, the modified conjugated diene-based polymer may satisfy mooney viscosity measured under conditions of ASTM D1646 of 90 or more, particularly, 95 to 120. Within this range, processability may be significantly excellent.

In addition, the modified conjugated diene-based polymer satisfies a mooney stress relaxation ratio (−S/R) measured at 100° C. of 0.40 or less. The mooney stress relaxation ratio may be an index of the degree of branching and molecular weight of a corresponding modified conjugated diene-based polymer, and particularly, the mooney stress relaxation ratio may be 0.35 or less. In addition, if the mooney stress relaxation ratio decreases, the degree of branching may mean high, and the molecular weight may mean large, and accordingly, the lower limit is not specifically limited, but may be 0.1 or more.

The mooney stress relaxation ratio measured at 100° C. may be an index of the degree of branching and molecular weight of the modified conjugated diene-based polymer as described above, and with the decrease of the mooney stress relaxation ration, the degree of branching and molecular weight of the modified conjugated diene-based polymer tend to increase. However, generally, the mooney stress relaxation ratio may be related to the above-described mooney viscosity, and though having the equal level of mooney viscosity according to the degree of branching of the polymer, the mooney stress relaxation ratio may be quite different. For example, if the branches of the modified conjugated diene-based polymer increase, the mooney stress relaxation ratio decreases, and accordingly, the mooney stress relaxation ratio may not be the same even with the same mooney viscosity due to the difference of the branches.

Meanwhile, the modified conjugated diene-based polymer according to an embodiment of the present invention satisfies the aforementioned mooney stress relaxation ratio at the aforementioned mooney viscosity, and processability and the degree of branching may be controlled, and mechanical properties such as tensile strength may be excellent even more.

In addition, the modified conjugated diene-based polymer according to an embodiment of the present invention may satisfy the 1,2-vinyl bond content of 30 wt % with respect to the total weight of the polymer. The vinyl content may mean the wt % of not 1,4-added but 1,2-added conjugated diene-based monomer with respect to a conjugated diene-based copolymer composed of a monomer having a vinyl group and an aromatic vinyl-based monomer, and may be affected by the termination point of polymerization reaction during polymerization, reaction environments at the termination point of polymerization reaction, or the like.

Particularly, the 1,2-vinyl bond content may be 5 to 30 wt %, preferably, 10 to 25 wt %, and according to the 1,2-vinyl bond content, abrasion resistance and rotation resistance may be influenced. If the 1,2-vinyl bond content is greater than 30 wt %, the glass transition temperature may also be influenced, and it is apprehended that rotation resistance and wet skid resistance may be deteriorated. Thus, reaction conditions need to pay attention so that the 1,2-vinyl bond content satisfies the above-described range during preparing the modified conjugated diene-based polymer.

In addition, the present invention provides a method for preparing the modified conjugated diene-based polymer.

The preparation method is characterized in including a step of polymerizing a conjugated diene-based monomer, or a conjugated diene-based monomer and an aromatic vinyl-based monomer in the presence of a nitrogen-containing modification initiator in a hydrocarbon solvent to prepare an active polymer (S1); a first modification reaction step of reacting the active polymer with an aminoalkoxysilane-based modifier (S2); and a second modification reaction step of reacting with an aminoepoxy-based modifier after the first modification reaction.

Hereinafter, the features of the modified conjugated diene-based polymer thus prepared, and the amine-containing modification initiator, monomer, aminoalkoxysilane-based modifier and aminoepoxy-based monomer used in the reaction are overlapped with the above-description, and the explanation thereon will be omitted.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the nitrogen-containing modification initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer.

The polymerization of step (S1) may be, for example, an anionic polymerization, and particularly, a living anionic polymerization by which an anionic active part is formed at the polymer terminal through a propagation reaction by anions. In addition, the polymerization of step (Si) may be a polymerization with heating, an isothermal polymerization, or a polymerization at a constant temperature (adiabatic polymerization). The polymerization at a constant temperature may mean a polymerization method including a step of polymerizing using self-generated heat of reaction without optionally applying heat after adding an initiator, and the polymerization with heating may mean a polymerization method including injecting the initiator and then, increasing the temperature by optionally applying heat. The isothermal polymerization may mean a polymerization method by which the temperature of a polymer is kept constant by increasing heat by applying heat or taking heat after adding the initiator.

In addition, according to an embodiment of the present invention, the polymerization of step (Si) may be performed by further including a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization of step (Si) may be performed in a temperature range of 100° C. or less, 50° C. to 100° C., or 50° C. to 80° C. Within the range, the conversion ratio of the polymerization reaction may increase, and the weight average molecular weight of the polymer may be satisfied while controlling the molecular weight distribution, and the improving effects of physical properties may be excellent.

The active polymer prepared by step (Si) may mean a polymer in which a polymer anion and an organometallic cation are combined.

According to an embodiment of the present invention, the active polymer prepared by the polymerization of step (S1) may be a random copolymer, and in this case, effects of excellent balance between each of physical properties may be achieved. The random copolymer may mean the arrangement of repeating units forming a copolymer in disorder.

Meanwhile, the polymerization of step (S1) may be performed by including a polar additive, and the polar additive may be added in a ratio of 0.001 g to 50 g, or 0.002 g to 0.1 g based on total 100 g of the monomer. In another embodiment, the polar additive may be added in a ratio of greater than 0 g to 1 g, 0.01 g to 1 g, or 0.1 g to 0.9 g based on total 100 g of the organometallic compound. In case of injecting the polar additive in the above-described range, the glass transition temperature, mooney viscosity and 1,2-vinyl bond content in the above-described ranges may be satisfied.

The polar additive may be, for example, one or more selected from the group consisting of tetrahydrofuran, ditetrahydrofurylpropane, diethyl ether, cyclopentyl ether, dipropyl ether, ethylene methyl ether, ethylene dimethyl ether, diethyl glycol, dimethyl ether, tert-butoxy ethoxy ethane, bis(2-dimethylaminoethyl) ether, (dimethylaminoethyl) ethyl ether, trimethylamine, triethylamine, tripropylamine, and tetramethylethylenediamine, and may preferably be triethylamine, or tetramethylethylenediamine. If the polar additive is included, and if a conjugated diene-based monomer and an aromatic vinyl-based monomer are copolymerized, the difference of reaction rates therebetween may be compensated, and effects of inducing easy formation of a random copolymer may be achieved.

In addition, step (S2) is a first modification reaction step for forming a first polymer chain by reacting an active polymer with an aminoalkoxysilane-based modifier and firstly modifying the active polymer, and may be performed by reacting the active polymer with the aminoalkoxysilane-based modifier.

In addition, the first modification reaction step may be performed to modify 10 wt % to 90 wt % of the total weight of the active polymer.

Here, the modification degree of the active polymer may be controlled by the ratio of the aminoalkoxysilane-based modifier against the active polymer and by the temperature and reaction time during the first modification reaction, and particularly, by using the aminoalkoxysilane-based modifier in 0.05 mmol to 0.20 mmol, or 0.10 mmol to 0.15 mmol based on total 100 g of the active polymer, 10 wt % to 90 wt % of the active polymer may be modified by the first modification reaction.

In addition, step (S3) is a second modification reaction step for forming a second polymer chain by reacting an unmodified active polymer which is not modified by the first modification reaction with an aminoepoxy-based modifier, and may be performed by reacting the firstly modified active polymer with an aminoepoxy-based modifier. In this case, the aminoepoxy-based modifier may be used so that the aminoalkoxy-based modifier and the aminoepoxy-based modifier have a weight ratio of 8:2 to 5:5.

The preparation method according to an embodiment of the present invention includes steps of performing first modification reaction using a modifier having relatively greater number of functional groups and performing second modification reaction using a modifier having relatively smaller number of functional groups, and may produce a modified conjugated diene-based polymer including a first polymer chain having a high degree of branching and a second polymer chain having a relatively lower degree of branching, simultaneously. The polymer includes the first polymer chain and the second polymer chain and shows effects of excellent mechanical properties and excellent processability.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber components as necessary in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as styrene-butadiene copolymer (SBR), polybutadiene (BR), polyisoprene (IR), butyl rubber (IIR), ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber, butyl rubber, and halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropyl-benzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effects of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mixing using a mixing apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among continuous reactors of three reactors connected in series, injected were a styrene solution in which 60 wt % of styrene was dissolved in n-hexane in a rate of 2.58 kg/h, a 1,3-butadiene solution in which 60 wt % of 1,3-butadiene was dissolved in n-hexane in a rate of 12.68 kg/h, n-hexane in a rate of 46.94 kg/h, a 1,2-butadiene solution in which 2.0 wt % of 1,2-butadiene was dissolved in n-hexane in a rate of 40 g/h, a solution in which 10 wt % of 2,2-(di-2(tetrahydrofuryl)propane was dissolved in n-hexane as a polar additive in a rate of 50.0 g/h, and an initiator solution in which 10 wt % of 1-methyl-4-(4-vinylbenzyl)piperazine was dissolved in n-hexane as a modification initiator in a rate of 50.0 g/h. At this time, the temperature of the first reactor was controlled to 60° C. and maintained. At a point where a polymerization conversion ratio reached 45%, a polymer was transported from the first reactor to a second reactor via a transport pipe.

Then, a 1,3-butadiene solution in which 60 wt % of 1,3-butadiene was dissolved in n-hexane was injected into the second reactor in a rate of 1.41 kg/h, the temperature of the second reactor was maintained to 70° C., and polymerization was continued. At a point where a polymerization conversion ratio reached 95% or more, the polymer was transported from the second reactor to a third reactor via a transport pipe.

During transporting the polymer from the second reactor to the third reactor, a first modifier solution in which 10 wt % of $N^1,N^1,N^3,N^3$-tetrakis(3-(trimethoxysilyl)propyl)propane-1,3-diamine was dissolved in n-hexane as a first modifier was injected into a transport part in a rate of 135.0 g/h, and a second modifier solution in which 5 wt % of 1,3,5-tris(oxiran-2-ylmethyl)-1,3,5-triazinane-2,4,6-trione was dissolved in n-hexane as a second modifier was injected into the third reactor in a rate of 56.1 g/h. The temperature of the third reactor was maintained to 75° C.

Then, to the polymerization solution discharged from the third reactor, a solution in which 30 wt % of IR1520 (BASF Co.) was dissolved as an antioxidant was injected in a rate of 167 g/h and stirred. The polymer thus obtained was put into hot water heated with steam and stirred to remove solvents to obtain a modified conjugated diene-based polymer.

Example 2

A modified conjugated diene-based polymer was prepared by performing the same method in Example 1 except for injecting an initiator solution in which 10 wt % of 1-phenyl-4-(4-vinylbenzyl)piperazine was dissolved in n-hexane in a rate of 60 g/h instead of 1-methyl-4-(4-vinylbenzyl)piperazine as the modification initiator, in Example 1.

Example 3

A modified conjugated diene-based polymer was prepared by performing the same method in Example 1 except for injecting a first modifier solution in which 10 wt % of 3-(2,2-dimethoxy-1,2-azasilolidin-1-yl)-N,N-bis(3-(trimethoxysilyl)propyl)propan-1-amine was dissolved in n-hexane in a rate of 99.8 g/h and reacting, instead of $N^1,N^1,N^3,N^3$-tetrakis(3-(trimethoxysilyl)propyl)propan-1,3-amine as the first modifier, in Example 1.

Example 4

A modified conjugated diene-based polymer was prepared by performing the same method in Example 1 except for injecting a first modifier solution in which 10 wt % of 3,3'-piperazine-1,4-diyl)bis(N,N-bis(3-(triethoxysilyl)propyl)propan-1-amine was dissolved in n-hexane in a rate of 187.5 g/h and reacting, instead of $N^1,N^1,N^3,N^3$-tetrakis(3-(trimethoxysilyl)propyl)propan-1,3-amine as the first modifier, in Example 1.

Example 5

A modified conjugated diene-based polymer was prepared by performing the same method in Example 1 except for injecting a second modifier solution in which 5 wt % of N,N'-(1,3-phenylenebis(methylene))bis(1-(oxiran-2-yl)-N-(oxiran-2-ylmethyl)methanamine was dissolved in n-hexane in a rate of 67.5 g/h and reacting, instead of 1,3,5-tris(oxiran-2-ylmethyl)-1,3,5-triazinan-2,4,6-trion as the second modifier, in Example 1.

Example 6

A modified conjugated diene-based polymer was prepared by performing the same method in Example 1 except for injecting a second modifier solution in which 5 wt % of 2-(oxiran-2-yl)-N,N-bis((oxiran-2-ylmethoxy)methyl)ethanamine was dissolved in n-hexane in a rate of 54 g/h and reacting, instead of 1,3,5-tris(oxiran-2-ylmethyl)-1,3,5-triazinan-2,4,6-trion as the second modifier, in Example 1.

Comparative Example 1

A modified conjugated diene-based polymer was prepared by performing the same method in Example 1 except for not injecting the second modifier solution, in Example 1.

Comparative Example 2

A modified conjugated diene-based polymer was prepared by performing the same method in Example 1 except for not injecting the first modifier solution, in Example 1.

Comparative Example 3

A modified conjugated diene-based polymer was prepared by performing the same method in Example 1 except for injecting a solution in which 10 wt % of $N^1,N^1,N^3,N^3$-tetrakis(3-(trimethoxysilyl)propyl)propan-1,3-amine was dissolved in n-hexane in a rate of 56.1 g/h as each of the first modifier solution and the second modifier solution, in Example 1.

Comparative Example 4

A modified conjugated diene-based polymer was prepared by performing the same method in Example 1 except for injecting a solution in which 5 wt % of 1,3,5-tris(oxiran-2-ylmethyl)-1,3,5-triazinan-2,4,6-trion was dissolved in n-hexane in a rate of 67.8 g/h as each of the first modifier solution and the second modifier solution, in Example 1.

Comparative Example 5

A modified conjugated diene-based polymer was prepared by performing the same method in Example 1 except for injecting a first modifier solution in which 10 wt % of N,N-diethyl-3-(trimethoxysilyl)propan-1-amine was dissolved in n-hexane in a rate of 105.0 g/h and reacting, instead of $N^1,N^1,N^3,N^3$-tetrakis(3-(trimethoxysilyl)propyl)propan-1,3-amine as the first modifier, in Example 1.

Comparative Example 6

A modified conjugated diene-based polymer was prepared by performing the same method in Example 1 except for injecting a second modifier solution in which 10 wt % of N,N-diethyl-3-(trimethoxysilyl)propan-1-amine was dissolved in n-hexane in a rate of 105 g/h instead of 1,3,5-tris(oxiran-2-ylmethyl)-1,3,5-triazinan-2,4,6-trion as the second modifier, in Example 1.

Experimental Example 1

With respect to each of the modified conjugated diene-based polymers prepared in the Examples and Comparative Examples, a weight average molecular weight (Mw, x$10^3$ g/mol), a number average molecular weight (Mn, x$10^3$ g/mol), molecular weight distribution (PDI, MWD), mooney viscosity (MV), a coupling number and a mooney stress relaxation ratio were measured, respectively, and the results are shown in Table 1 below.

1) Weight Average Molecular Weight (Mw), Number Average Molecular Weight (Mn), and Molecular Weight Distribution (PDI)

By gel permeation chromatography (GPC) analysis, the weight average molecular weight (Mw) and the number average molecular weight (Mn) were measured and the molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C(Polymer Laboratories Co.) in combination, and polystyrene (PS) as a GPC standard material for calculating the molecular weights. A solvent for measuring GPC was prepared by mixing tetrahydrofuran with 2 wt % of an amine compound.

2) Mooney Viscosity (MV) and Mooney Stress Relaxation Ratio (−S/R)

The mooney viscosity (MV, (ML1+4, @100° C. MU)) was measured by using MV-2000 (ALPHA Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

In addition, after measuring the mooney viscosity, the slope value of the change of the mooney viscosity shown while releasing torque was measured, and from the absolute value thereof, the mooney relaxation ratio was obtained.

diene-based copolymers prepared in the Examples and Comparative Examples, and molded products manufactured therefrom, processability properties and abrasion resistance were measured, respectively, and the results are shown in Table 3 below.

1) Preparation of Rubber Specimen

Compounding was performed using each of the modified conjugated diene-based polymers of the Examples and Comparative Examples as a raw material rubber under the compounding conditions shown in Table 2 below. The raw materials in Table 2 are represented by parts by weight based on 100 parts by weight of the raw material rubber.

TABLE 2

| Division | Raw material | Amount (parts by weight) |
|---|---|---|
| First stage mixing | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |

TABLE 1

| Division | | Example | | | | | |
|---|---|---|---|---|---|---|---|
| | | 1 | 2 | 3 | 4 | 5 | 6 |
| GPC | Mw (×10³ g/mol) | 1384 | 1388 | 1350 | 1394 | 1372 | 1364 |
| | Mn (×10³ g/mol) | 753 | 767 | 741 | 705 | 758 | 739 |
| | PDI | 1.83 | 1.81 | 1.82 | 1.83 | 1.81 | 1.85 |
| Mooney viscosity | | 103 | 103 | 100 | 106 | 101 | 100 |
| −S/R | | 0.3189 | 0.3234 | 0.3486 | 0.3044 | 0.3200 | 0.3049 |

| Division | | Comparative Example | | | | | |
|---|---|---|---|---|---|---|---|
| | | 1 | 2 | 3 | 4 | 5 | 6 |
| GPC | Mw (×10³ g/mol) | 1412 | 1089 | 1545 | 1235 | 856 | 1377 |
| | Mn (×10³ g/mol) | 756 | 622 | 813 | 667 | 479 | 740 |
| | PDI | 1.87 | 1.74 | 1.90 | 1.85 | 1.79 | 1.86 |
| Mooney viscosity | | 112 | 89 | 118 | 97 | 72 | 98 |
| −S/R | | 0.2852 | 0.4796 | 0.2657 | 0.4576 | 0.7490 | 0.3766 |

As shown in Table 1 above, it was confirmed that Examples 1 to 6 have high molecular weights and narrow molecular weight distribution and show controlled mooney stress relaxation ratios (degrees of branching) to an around middle level when compared to Comparative Examples 1 to 6.

Experimental Example 2

In order to compare and analyze the physical properties of rubber compositions including the modified conjugated TABLE 2-continued

| Division | Raw material | Amount (parts by weight) |
|---|---|---|
| Second stage mixing | Sulfur | 1.5 |
| | Rubber accelerator | 1.75 |
| | Vulcanization accelerator | 2 |

Particularly, the rubber specimen was mixed via a first stage mixing and a second stage mixing. In the first stage mixing, a raw material rubber, silica (filler), an organic silane coupling agent (X50S, Evonik), a process oil (TDAE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystalline Wax) were mixed using a banbury mixer equipped with a temperature controlling apparatus. In this case, the initial temperature of a mixing apparatus was controlled to 70° C., and after finishing compounding, a first compound mixture was obtained at a discharge temperature of 145° C. In the second stage mixing, the first compound mixture was cooled to room temperature, and the first compound mixture, sulfur, a rubber accelerator (DPD (diphenylguanine)), and a vulcanization accelerator (CZ(N-cyclohexyl-2-benzothiazylsulfenamide)) were added to the mixing apparatus and mixed at a temperature of 100° C. or less to obtain a second compound mixture. Then, via a curing process at 160° C. for 20 minutes, a rubber specimen was formed.

2) Processability Properties

By measuring the mooney viscosity (MV, ML 1+4, @100° C. MU) of the second compound mixture obtained during 1) preparation of rubber specimen, the processability properties of each polymer were compared and analyzed. The resultant values in Table 3 below are index values based on the resultant value measured for Comparative Example 1, and the lower the value is, the better the properties are.

Particularly, by using MV-2000 (Alpha Technologies Co.) using Large Rotor at a rotor speed of 2±0.02 rpm at 100° C., each second compound mixture was stood at room temperature (23±3° C.) for 30 minutes or more, and 27±3 g was collected and put in a die cavity, and then, Platen was operated for 4 minutes for measurement.

3) Abrasion Resistance (DIN Abrasion Test)

For each rubber specimen, DIN abrasion test was performed based on ASTM D5963, and DIN loss index (loss volume index: abrasion resistance index (ARIA), Method A) is shown. The resultant values in Table 3 are index values based on the resultant value measured for Comparative Example 1, and the higher the value is, the better the abrasion resistance is.

4) Rotation Resistance

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. In this case, if the tan δ value at a high temperature of 60° C. increases, hysteresis loss decreases, and rotation resistance (fuel consumption ratio) is excellent. Meanwhile, the resultant values in Table 3 are indexed based on the resultant value of Comparative Example 1.

TABLE 3

| Division | Example | | | | | | Comparative Example | | | | | |
|---|---|---|---|---|---|---|---|---|---|---|---|---|
| | 1 | 2 | 3 | 4 | 5 | 6 | 1 | 2 | 3 | 4 | 5 | 6 |
| Processability (Index) | 92 | 92 | 90 | 93 | 90 | 90 | 100 | 80 | 110 | 86 | 82 | 109 |
| Abrasion resistance (Index) | 100 | 100 | 98 | 101 | 99 | 100 | 100 | 89 | 103 | 97 | 81 | 101 |
| Rotation resistance (Index) | 101 | 102 | 98 | 103 | 101 | 99 | 100 | 82 | 98 | 86 | 89 | 97 |

As shown in Table 3 above, it was confirmed that Examples 1 to 6 showed excellent rotation resistance, processability and abrasion resistance in balance in contrast to Comparative Examples 1 to 6.

Particularly, Example 1 to Example 6 showed uniformly excellent properties of processability, abrasion resistance and rotation resistance to equivalent levels, on the contrary, Comparative Examples 1, 3 and 6 showed largely degraded processability by 10% or more in contrast to Examples 1 to 6, and Comparative Examples 2, 4 and 5 showed markedly degraded rotation resistance and abrasion resistance by 10% or more in contrast to Examples 1 to 6. In this case, Comparative Examples 1 to 6 correspond to polymers prepared by not performing modification reaction using an aminoalkoxysilane-based modifier or an aminoepoxy-based modifier, or by performing modification reaction with the two modifiers but using a compound including less than 6 alkoxy groups in a molecule as the aminoalkoxysilane-based modifier.

From the results, it could be confirmed that the modified conjugated diene-based polymer according to the present invention includes a first polymer chain and a second polymer chain, which have different degrees of branching, by including a functional group having affinity with a filler in each and being prepared by using two types of modifiers having different numbers of functional groups having reaction activity with an active polymer, and has a high molecular weight and controlled molecular weight distribution and degree of branching, thereby showing excellent effects of mechanical properties, processability and rotation resistance in balance (see Table 1 and Table 3).

The invention claimed is:

1. A modified conjugated diene-based polymer comprising a first polymer chain and a second polymer chain,
    wherein each of the first polymer chain and the second polymer chain comprises a repeating unit derived from a conjugated diene-based monomer and a derived unit from a nitrogen-containing modification initiator,
    the first polymer chain comprises a derived unit from an aminoalkoxysilane-based modifier in at least one terminal,
    the second polymer chain comprises a derived unit from an aminoepoxy-based modifier in at least one terminal, and
    the aminoalkoxysilane-based modifier comprises 6 or more alkoxy groups in a molecule.

2. The modified conjugated diene-based polymer of claim 1, wherein each of the first polymer chain and the second polymer chain further comprises a repeating unit derived from an aromatic vinyl-based monomer.

3. The modified conjugated diene-based polymer of claim 1, wherein the aminoepoxy-based modifier comprises 4 or less polymer modification functional groups in a molecule, and
    the polymer modification functional group comprises an epoxy group, or an alkoxy group and an epoxy group.

4. The modified conjugated diene-based polymer of claim 1, wherein the nitrogen-containing modification initiator is a reaction product of a nitrogen-containing compound and an organometallic compound, and
    the nitrogen-containing compound is a styrene-based compound comprising a substituted with a substituent or unsubstituted amino group, amide group, imino group, imidazole group, pyrimidyl group or cyclic amino group in a molecule, where the substituent is an alkyl group of 1 to 20 carbon atoms, a cycloalkyl group of 3 to 20 carbon atoms, an aryl group of 6 to 20 carbon atoms, an alkylaryl group of 7 to 20 carbon atoms, an arylalkyl group of 7 to 20 carbon atoms, or an alkoxysilyl group of 1 to 10 carbon atoms.

5. The modified conjugated diene-based polymer of claim 4, wherein the nitrogen-containing compound is a compound represented by the following Formula 1:

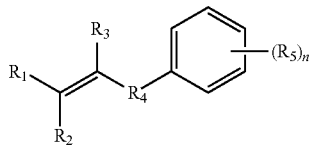

[Formula 1]

in Formula 1,

R$_1$ to R$_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, R$_4$ is a single bond; a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, R$_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by the following Formula 1a or Formula 1b, and n is an integer of 1 to 5, at least one among R$_5$ groups is a functional group represented by the following Formula 1a or Formula 1b, in the case where n is an integer of 2 to 5, multiple R$_5$ groups may be the same or different from each other:

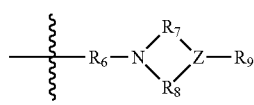

[Formula 1a]

in Formula 1a,

R$_6$ is a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, R$_7$ and R$_8$ are each independently an alkylene group of 1 to 20 carbon atoms substituted with an alkyl group of 1 to 10 carbon atoms, a cycloalkyl group of 5 to 20 carbon atoms, or an aryl group of 5 to 20 carbon atoms or unsubstituted, R$_9$ is hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and Z is an N, O or S atom, in the case where Z is O or S, R$_9$ is not present,

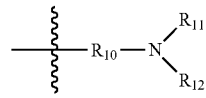

[Formula 1b]

in Formula 1b,

R$_{10}$ is a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 5 to 20 carbon atoms, where the substituent is an alkyl group of 1 to 10 carbon atoms, a cycloalkyl group of 5 to 10 carbon atoms, or an aryl group of 5 to 20 carbon atoms, and R$_{11}$ and R$_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

6. The modified conjugated diene-based polymer of claim 1, wherein the aminoalkoxysilane-based modifier is one or more selected from compounds represented by the following Formula 2 to Formula 4:

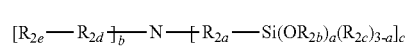

[Formula 2]

in Formula 2,

R$_{2a}$ and R$_{2d}$ are each independently a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, R$_{2b}$ and R$_{2c}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, or an aryl group of 6 to 20 carbon atoms, and $R_{2e}$ is an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, a heterocyclic group of 2 to 10 carbon atoms, or —N—[$R_{2f}$—Si($OR_{2g}$)$_a$($R_{2h}$)$_{3-a}$]$_2$, where $R_{2f}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, $R_{2g}$ and $R_{2h}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, or an aryl group of 6 to 20 carbon atoms, d is an integer of 1 to 3, a is an integer of 1 to 3, b is 0 or 1, and c is 2 or 3, where in the case where b is 0, and in the case where b is 1, and $R_{2e}$ is not —N—[$R_{2f}$—Si($OR_{2g}$)$_d$($R_{2h}$)$_{3-d}$]$_2$, a+c is 5 or 6, and in the case where b is 1, and $R_{2e}$ is —N—[$R_{2f}$—Si($OR_{2g}$)$_d$($R_{2h}$)$_{3-a}$]$_2$, a+c is 4 or 5,

[Formula 3]

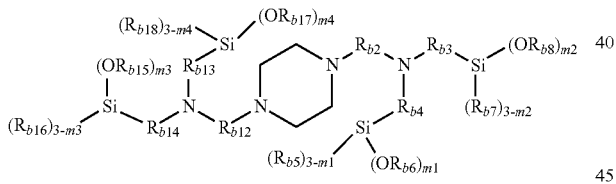

in Formula 3, $R_{b2}$ to $R_{b4}$ are each independently an alkylene group of 1 to 10 carbon atoms, $R_{b5}$ to $R_{b8}$ are each independently an alkyl group of 1 to 10 carbon atoms, $R_{b12}$ to $R_{b14}$ are each independently an alkylene group of 1 to 10 carbon atoms, $R_{b15}$ to $R_{b18}$ are each independently an alkyl group of 1 to 10 carbon atoms, and $m_1$, $m_2$, $m_3$ and $m_4$ are each independently an integer of 1 to 3,

[Formula 4]

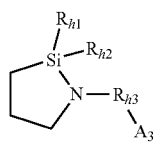

in Formula 4, $R_{h1}$ and $R_{h2}$ are each independently an alkyl group of 1 to 10 carbon atoms or an alkoxy group of 1 to 10 carbon atoms, $R_{h3}$ is a single bond or an alkylene group of 1 to 10 carbon atoms, and $A_3$ is —N[Si($R_{h4}R_{h5}R_{h6}$)]$_2$, where $R_{h4}$ to Rho are each independently an alkoxy group of 1 to 10 carbon atoms.

7. The modified conjugated diene-based polymer of claim 1, wherein the aminoepoxy-based modifier is a compound represented by the following Formula 5 to Formula 7:

[Formula 5]

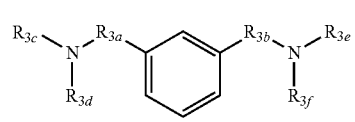

in Formula 5, $R_{3a}$ and $R_{3b}$ are each independently an alkylene group of 1 to 10 carbon atoms, and $R_{3c}$ to $R_{3f}$ are each independently hydrogen, an alkyl group of 1 to 10 carbon atoms or —$R_{3g}R_{3h}$, where at least one among $R_{3c}$ to $R_{3f}$ is —$R_{3g}R_{3h}$, $R_{3g}$ is a single bond or an alkylene group of 1 to 10 carbon atoms, which includes or excludes a heteroatom, and $R_{3h}$ is an alkoxysilyl group of 1 to 10 carbon atoms or an epoxy group,

[Formula 6]

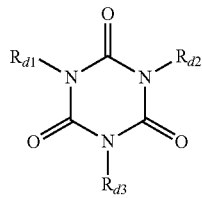

in Formula 6, $R_{a1}$ to $R_{a3}$ are each independently hydrogen, an alkyl group of 1 to 10 carbon atoms or —$R_{a4}R_{a5}$, where at least one among $R_{a1}$ to $R_{a3}$ is —$R_{a4}R_{a5}$, $R_{a4}$ is an alkylene group of 1 to 10 carbon atoms, which includes or excludes a heteroatom, and Ras is an epoxy group,

[Formula 7]

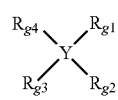

in Formula 7, $R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or —$R_{g5}OR_{g6}$, where at least one among $R_{g1}$ to $R_{g4}$ is —$R_{g5}OR_{g6}$, $R_{g5}$ is a single bond or an alkylene group of 1 to 10 carbon atoms, and $R_{g6}$ is an epoxyalkyl group of 3 to 10 carbon atoms, and Y is C or N, in the case where Y is N, $R_{g4}$ is not present.

8. The modified conjugated diene-based polymer of claim 1, wherein the modified conjugated diene-based polymer has a weight average molecular weight is 1,000,000 g/mol to 3,000,000 g/mol, and molecular weight distribution of 1.0 to 2.0.

9. The modified conjugated diene-based polymer according to claim 1, wherein each of Si content and N content is 70 ppm or more based on a total weight of the modified conjugated diene-based polymer.

10. A rubber composition comprising the modified conjugated diene-based polymer of claim 1, and a filler.

11. The rubber composition of claim 10, comprising 100 parts by weight of the modified conjugated diene-based polymer and 0.1 parts by weight to 200 parts by weight of the filler.

* * * * *